United States Patent Office 2,999,024
Patented Sept. 5, 1961

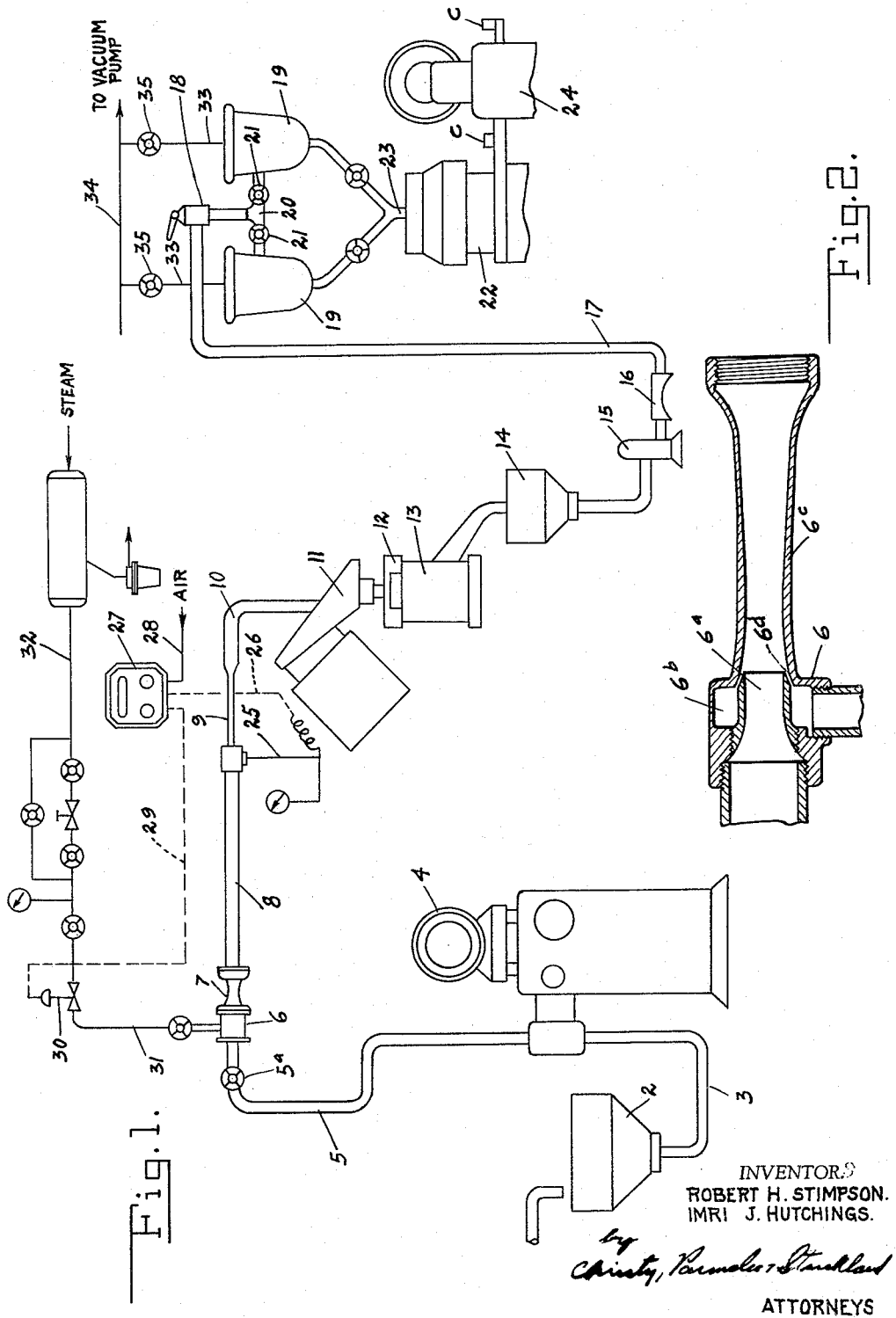

2,999,024
METHOD OF PREPARING COOKED EGG YOLK AND COOKED EGG YOLK PRODUCT
Robert H. Stimpson, Pittsburgh, and Imri J. Hutchings, Glenshaw, Pa., assignors to H. J. Heinz Company, Pittsburgh, Pa., a corporation of Pennsylvania
Filed Dec. 12, 1957, Ser. No. 702,424
7 Claims. (Cl. 99—182)

This invention relates to eggs which are packed and sold in hermetically sealed jars or containers, and is for a method of and apparatus for making an egg product in the nature of a smooth gelled mass of consistency, color and texture resembling a baked custard which, in unopened jars or containers, will remain in this condition for an indefinite period of time. Eggs so prepared are especially useful for the feeding of infants and invalids. Our invention further includes said product.

It may be first explained that for the feeding of infants, egg yolks are preferable to whole eggs since the albumen of the egg white in substantial amounts is generally considered to be detrimental to infants. Our invention therefore is particularly applicable to the processing of egg yolks from which at least most of the whites have been separated.

Many attempts have been made to pack eggs or egg yolks in sealed containers, and provide a product which is sterile, of smooth custard-like texture, of good color and flavor, and free of any preservative. One difficulty is that after the egg product has been prepared and placed in sealed containers, the filled containers must then be heated to a relatively high temperature for a prolonged period of time to effect sterilization, and during this sterilization operation further "cooking" of the product takes place, tending to produce a tough, cheese-like mass.

The primary object of the present invention is to provide an economical rapid method and apparatus for uniformly processing egg yolks wherein the sterilized product is of uniformly good color, flavor and texture. A further object of our invention is to provide a method and apparatus which is automatic in its operation. A further object is to provide a new egg yolk product.

According to our invention, egg yolks which have been previously frozen and then incompletely thawed are mixed with water to form a slurry which is forced under pressure into an injector where steam at the required temperature disintegrates the mix and the particles of egg yolk are almost instantaneously heated to a temperature where the protein content is completely degraded or coagulated at a temperature above that subsequently reached in the sterilizing process. The resulting completely cooked egg particles are passed through a disintegrator, screened and milled without being cooled below the coagulation temperature of the protein. It is then flashed in a deaerator to remove entrained air, but to a temperature not below about 170° F., and at this temperature it is filled into containers which are then sealed and the containers heated for a period of time required to sterilize the product. The material charged into the containers is a watery slurry or suspension in which the protein has been completely degraded or coagulated. As sterilization proceeds, the solids imbibe or take up the liquid, the mass gelling within the container as the imbibition of the liquid continues.

To be more exact, as egg yolks with water are heated above 170° F. coagulation of the protein material takes place, producing a rough textured mass resembling scrambled eggs, and this condition prevails up to 283° F. However, when the mix is heated almost instantly and for a short time in the range between 283° F. and 292° F., and in this range only the protein undergoes a state of change characterized by the liquefaction of the coagulated protein material. This change is known as "heat denaturization." This liquid condition will disappear if the temperature goes above 292° F., but once the product has been liquefied by subjection to a temperature of between 283° F.–292° F. it may be subsequently cooled below 283° F. without change in its liquid state. This occurs only if the above temperature range is adhered to. When it is placed in a jar and sealed and sterilized at 230° F., the denatured protein molecules imbibe water, producing a gel of smooth custard-like consistency.

Our invention may be more fully understood by reference to the accompanying drawing, in which:

FIG. 1 is a schematic diagram of the apparatus for practicing our invention; and
FIG. 2 is a longitudinal section showing one form of injector suitable for our purposes.

In the drawings, 2 is a hopper into which the mixture of egg yolks and water to be processed is discharged. It is carried through pipe 3 to a piston pump 4 by which it is forced under heavy pressure through pipe 5 and valve 5a to a high pressure steam injector 6. There is a venturi 7 into which the injector discharges, and this opens into one end of a pipe 8 constituting a closed environment in which the cooking of the product takes place. At the opposite end of the pipe 8 is an orifice tube 9 which creates the desired back pressure in pipe 8. There is a pipe 10 connected to the discharge end of the orifice tube. This part of the apparatus, including the injector, is substantially the same as that shown in application Serial No. 507,262, filed May 10, 1955, by James B. Anderson. The injector, as shown in FIG. 2, may include a central tube 6a which is surrounded by a hollow annulus 6b to which high pressure steam is delivered. While the product enters one end of the central tube, the other end of this tube opens into the venturi 6c. Steam flows through an annular port 6d from the steam chamber into the throat of the venturi while the discharge end of the venturi is joined to the pipe 8.

Pipe 10 delivers the product to a disintegrator 11, as for example a well-known "Rietz Rad. 4" having a .062" screen through which the product is forced by hammers. The discharge of the disintegrator is through a four-mesh stationary screen that removes any oversize particles, the screen unit being designated 12. It is then passed through a mill 13, known as a "Premier type U–3" equipped with steel attrition plates set for .020" clearance.

The product is discharged from the mill into a closed hopper 14 from which it is pumped by pressure pump 15 through pipe 17, equipped with a pressure relief valve 18 selectively into either of two deaerator vessels 19, there being a divided pipe 20 connected to pipe 17, one branch of this divided pipe going to one deaerator 19 and the other branch to the other, each of the two branches having shut-off valves 21 therein. A magnetic trap is indicated in the line 17 at 16.

The product then flows from the deaerators to a container filling machine 22 of standard construction, there being a branched pipe 23 leading from the deaerators to the filling machine. At 24 there is indicated a container closing or capping machine.

As indicated above, there is a critical temperature range between 283° F. and 292° F. at which the liquefication of the protein essential to our process occurs, and the temperature in the processing tube 8 must be closely controlled. Any thermometer bulb or other heat-responsive device projected into the tube becomes so quickly covered with product that it does not give quick or accurate response. We therefore control the temperature by controlling the rate at which high temperature steam is introduced at the injector.

For this purpose there is a vertical tube 25 depending from the tube 8 and forming a sealed water leg from the base of which there is a tube 26 connected to one side of a standard pressure indicator and controller 27 (such as a Taylor Instrument Co. 161 R.F. 1351). This instrument, besides indicating pressure, controls the flow of high pressure air supplied through pipe 28 into a pipe 29 leading to a standard air operated steam control throttle valve 30. This valve is located in a pipe line 31 leading from the injector 6 to a high pressure steam source 32. Pressure gauges are provided wherever desired. As the pressure in tube 8 tends to rise or fall, the pressure on the water leg increases or decreases and the instrument 27 responds accordingly to decrease or increase the flow of steam by operation of the throttle valve 30. Steam is thus supplied to the tube 8 at a rate sufficient to maintain the proper pressure, and therefore the correct temperature. This will be a gauge pressure between 38 p.s.i. and 41 p.s.i.

Each of the deaerator vessels 19 is connected through a pipe 33 with an exhaust or vacuum header 34, there being a valve 35 in each of the pipes 33. Sufficient vacuum is maintained in the deaerator vessel when it is receiving product to flash the product as it is discharged and drop the temperature of the product about 20° F. This removes air and some water vapor.

In a typical example, frozen egg yolks are partially thawed in standard 250 gallon kettles. Before thawing is completed, water is added in the ratio of about 56 pounds of water to 150 pounds of frozen egg yolks. Also some salt for flavoring may be added. This mixture is stirred to make a uniform mix or slurry, it being preferred that the temperature of the mix does not exceed 45° F., so that there is no cooking or heating of the egg yolk to cooking temperature while the slurry is being prepared. The mix so prepared is discharged into the hopper 2 from which it is pumped under pressure by the piston or positive displacement pump 4 to the injector 6 at a rate of about 3½ to 4 gallons per minute.

High pressure steam is introduced into the injector at a rate and velocity to entrain the slurry and disintegrate it into a spray-like condition or dispersion of discrete particles where the particles are enveloped by steam as the continuous phase of the dispersion. The temperature of the steam and the pressure are sufficient to maintain a temperature in the environment within the tube 8 between 283° F. and 292° F. Under these conditions the finely-divided particles of egg yolk are almost instantly heated and cooked and the average retention time of a particle in the tube 8 is about .0273 second. During this time, and at this temperature, the protein of the egg yolk is denatured. The tube 8 is typically 119¼" long with an internal diameter of about 1.402", while the orifice tube 9 has an internal diameter of about 9/16". In this procedure all of the egg protein is coagulated and is denatured to the extent that the resulting product is predominantly liquid, but of course contains cooked solids of the egg yolk.

It may be pointed out that a piston type pump is preferably used at 4 since with other pumps, "blow back" of steam may occur. This almost instantly converts the egg product in the hopper to "scrambled" eggs. A piston pump precludes this.

The cooked product is carried by the steam through the restricted pipe 9 into the pipe 10 which leads to the enclosed disintegrator 11 where the product so removed from the cooking environment is forced by hammers through a .0625 mesh screen. The product is then passed through a standard four mesh screen 12 which removes any oversized particles. The four mesh screen enables the screens to be successively brought into use while those which have been used can be removed and cleaned. Most of the steam that has not condensed is vented at the disintegrator.

The product is then processed in the Premier mill which is an apparatus well known to the food industry. It has two steel attrition discs which are set for .020" clearance. This mill is preferably water jacketed for circulation of hot water therethrough, and the product while being milled is at a temperature of around 195° F., well above the coagulation temperature of egg protein. The milling reduces the product to a fine smooth slurry that is discharged into hopper 14. From this hopper, still at a temperature of about 195° F., the product is delivered to one of the two deaerators 19, one of which is filling while the other is emptying. Sufficient vacuum is maintained in the deaerator into which the product is flowing to produce a 20° F. flash, dropping the temperature to about 175° F. When one deaerator has been filled to its limit, the product is turned into the other and the vacuum is released from the first and the deaerated product flows to the container filling machine 22, this being a standard piece of apparatus. The product is charged into the containers C at its minimum temperature of around 170° F. The filled containers are closed and sealed or capped in machine 24, also of well-known construction, and then pass into a retort, autoclave, or the like, where the product in the sealed containers is sterilized at a temperature above 212° F., specifically in this example at 230° F. for about 110 minutes, assuming the containers to be the usual size of baby food containers, viz, about 3¼ ounces. If the product at the start of the sterilizing operation is below 170° F., the time of sterilizing is lengthened. It is therefore desirable to avoid cooling below about 170° F. Cooling the product below that temperature is not detrimental to the product, but results in heat losses and longer sterilizing time. On the other hand, it would accomplish nothing to try to keep the product above 170° F. in view of the temperature drop resulting from flashing the product to remove air and some of the water.

During sterilizing above 212° F., the denatured protein will imbibe water and the mass will develop a smooth custard-like appearance and texture. Gelation occurs entirely through the imbibition of liquid by the denatured protein, just as dried egg albumen, denatured by removal of water, when recontacted with water and heated swells up and forms a gel.

Our invention results in a product which is stable under the usual conditions under which products of this kind are sold, is of superior texture and flavor, and has good color quality. It is digestible for infants and invalids, and the processing is such that all of the valuable food qualities of cooked egg yolk are retained.

While we have disclosed one particular apparatus and described in one specific example our process, it will be understood that variations may be made, both by additions to the product and in the apparatus and procedure within the contemplation of our invention.

We claim:

1. The method of preparing an edible food product from a mixture comprising egg yolks and water, which method comprises mixing the egg yolk and water before heating to produce a slurry, forcing the mixture at a predetermined rate into an atmosphere of steam moving at high velocity through a closed environment to a restricted discharge orifice to divide the slurry into a dispersion of fine particles while cooking the egg material in the surrounding atmosphere of steam, maintaining the steam in said environment at a temperature between 283° F. and 292° F. and thereby completely coagulating the protein of the egg and converting it to a liquid, straining and milling the cooked product at a temperature below the temperature in said environment but above 175° F., deaerating the product to a temperature of about 175° F., charging the product into containers, sealing the containers, and sterilizing the product within the containers.

2. In the process of preparing an edible cooked egg yolk product packaged in sealed containers, the steps of mixing egg yolk material with water before heating to produce a slurry, injecting the mixture under pressure into a closed environment, dispersing the mixture in said environment into discrete particles with an atmosphere of steam constituting the continuous phase of the dispersion, maintaining said atmosphere of steam in said environment at a temperature in the range between 283° F. and 292° F., thereby substantially instantly entirely cooking the egg yolk material and heat denaturing the protein, removing the cooked egg product, deaerating it and then sterilizing it in closed containers at a temperature above 212° F. until sterile and until the heat denatured protein imbibes water to product a gel.

3. The method of preparing egg yolks which comprises forming a slurry of water and uncooked, unheated egg yolks, dispersing the slurry in finely-divided form into an enveloping atmosphere of steam in a closed environment in which the temperature is maintained between 283° F. and 292° F. to effect denaturization of the egg protein to a liquid, removing the egg product and steam together from said environment and separating steam from the egg product, placing the product in closed containers and heating the product in said closed containers to effect imbibition of water in the product by the protein and bring about gelation and also sterilize the product.

4. The method defined in claim 3 wherein the steam-cooked product is strained and milled at a temperature of the order of 195° F. and then deaerated and water of condensation removed therefrom before the product is placed in the closed containers.

5. In the process of preparing canned edible egg yolk material wherein a slurry of unheated, uncooked egg yolk material and water is first formed, the steps comprising continuously introducing the slurry at a predetermined rate into a high-velocity stream of steam flowing through a closed environment at a rate and pressure to maintain a temperature of between 283° F. and 292° F. in said environment and by such current of steam disintegrate the slurry into minute particles enveloped in the steam and effecting thereby the coagulation of all of the egg protein in less than one second with the protein in this temperature range being denatured to a liquid condition so that the resulting product is predominantly liquid, carrying the product from said environment to a deaerator operating under vacuum and while maintaining the temperature of the product entering the deaerator at about 195° F., flashing the product in the deaerator to a temperature of about 175° F. to remove condensate therefrom, filling the product into containers before it has cooled and while the temperature is around 170° F., sealing the containers which have been filled and sterilizing the enclosed product in a heated environment at a temperature above 212° F.

6. The process defined in claim 5 wherein the cooked slurry before entering the deaerator is first passed through a disintegrator while the temperature thereof is maintained at approximately 195° F. and disintegrating and screening the product and milling it while maintaining the product at said temperature after which it is then conveyed to the deaerator.

7. As a new product, egg material prepared in accordance with the process of claim 1.

References Cited in the file of this patent

UNITED STATES PATENTS

| | | |
|---|---|---|
| 2,545,308 | Ritchie | Mar. 13, 1951 |
| 2,766,126 | Hawk | Oct. 9, 1956 |